United States Patent
Kupiszewski et al.

(10) Patent No.: US 10,415,897 B2
(45) Date of Patent: Sep. 17, 2019

(54) MONOLITHIC TUBE-IN MATRIX HEAT EXCHANGER

(71) Applicant: GENERAL ELECTRIC COMPANY, Schenectady, NY (US)

(72) Inventors: Thomas Kupiszewski, Liberty Township, OH (US); Mehdi Milani Baladi, Cincinnati, OH (US); John Andrew Kemme, Mason, OH (US); Christopher Charles Glynn, Lawrenceburg, IN (US); Steven Douglas Johnson, Milford, OH (US); Michael Jay Epstein, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/037,432

(22) PCT Filed: Nov. 17, 2014

(86) PCT No.: PCT/US2014/065966
§ 371 (c)(1),
(2) Date: May 18, 2016

(87) PCT Pub. No.: WO2015/126483
PCT Pub. Date: Aug. 27, 2015

(65) Prior Publication Data
US 2016/0290738 A1 Oct. 6, 2016

Related U.S. Application Data

(60) Provisional application No. 61/905,511, filed on Nov. 18, 2013.

(51) Int. Cl.
*F28F 7/02* (2006.01)
*F28F 1/40* (2006.01)
(Continued)

(52) U.S. Cl.
CPC .......... *F28F 7/02* (2013.01); *F28F 1/06* (2013.01); *F28F 1/40* (2013.01); *F28F 13/12* (2013.01);
(Continued)

(58) Field of Classification Search
CPC ........ F28F 1/06; F28F 7/02; F28F 1/40; F28F 13/12; F28F 19/02; F28F 21/08; G01M 3/188; G01M 3/045
See application file for complete search history.

(56) References Cited

U.S. PATENT DOCUMENTS 1,571,068 A * 1/1926 Stancliffe .............. F28D 7/0025
122/32
5,318,109 A * 6/1994 Yamada .................. F22B 37/40
122/4 R
(Continued)

FOREIGN PATENT DOCUMENTS

CN 1864044 A 11/2006
CN 101918783 A 12/2010
(Continued)

OTHER PUBLICATIONS

First Office Action and Search issued in connection with corresponding CN Application No. 201480063014.6 dated May 9, 2017.
(Continued)

*Primary Examiner* — Tho V Duong
(74) *Attorney, Agent, or Firm* — Dority & Manning, P.A.

(57) ABSTRACT

A cross-flow heat exchanger for gas turbine engines which may be utilized to transfer heat from one fluid flow to a second independent fluid flow wherein one of the fluid flows has a high differential inlet pressure and temperature. The heat exchanger has robust construction to inhibit mixing of the fluid flows during a single burst duct event.

21 Claims, 18 Drawing Sheets

(51) Int. Cl.
  *F28F 19/02* (2006.01)
  *F28F 21/08* (2006.01)
  *F28F 1/06* (2006.01)
  *F28F 13/12* (2006.01)
  *F28D 21/00* (2006.01)

(52) U.S. Cl.
  CPC .............. *F28F 19/02* (2013.01); *F28F 21/08* (2013.01); *F28D 2021/0021* (2013.01); *F28F 2265/00* (2013.01); *F28F 2265/16* (2013.01)

(56) References Cited

U.S. PATENT DOCUMENTS

| | | | | |
|---|---|---|---|---|
| 5,551,504 A | * | 9/1996 | Zifferer | B21C 37/151 165/155 |
| 5,891,584 A | | 4/1999 | Coffinberry | |
| 2003/0173720 A1 | * | 9/2003 | Musso | C04B 38/0006 264/635 |
| 2007/0229066 A1 | * | 10/2007 | Narishige | G01N 27/902 324/222 |
| 2010/0314081 A1 | * | 12/2010 | Reis | F24J 2/07 165/134.1 |
| 2011/0093220 A1 | * | 4/2011 | Yang | G01M 3/243 702/51 |

FOREIGN PATENT DOCUMENTS

| | | | | | |
|---|---|---|---|---|---|
| GB | 2083603 A | * | 3/1982 | ............ | F16L 11/121 |
| JP | 2002295987 A | * | 10/2002 | ................ | F28F 1/06 |

OTHER PUBLICATIONS

Second Office Action issued in connection with corresponding CN Application No. 201480063014.6 dated Sep. 27, 2017.

* cited by examiner

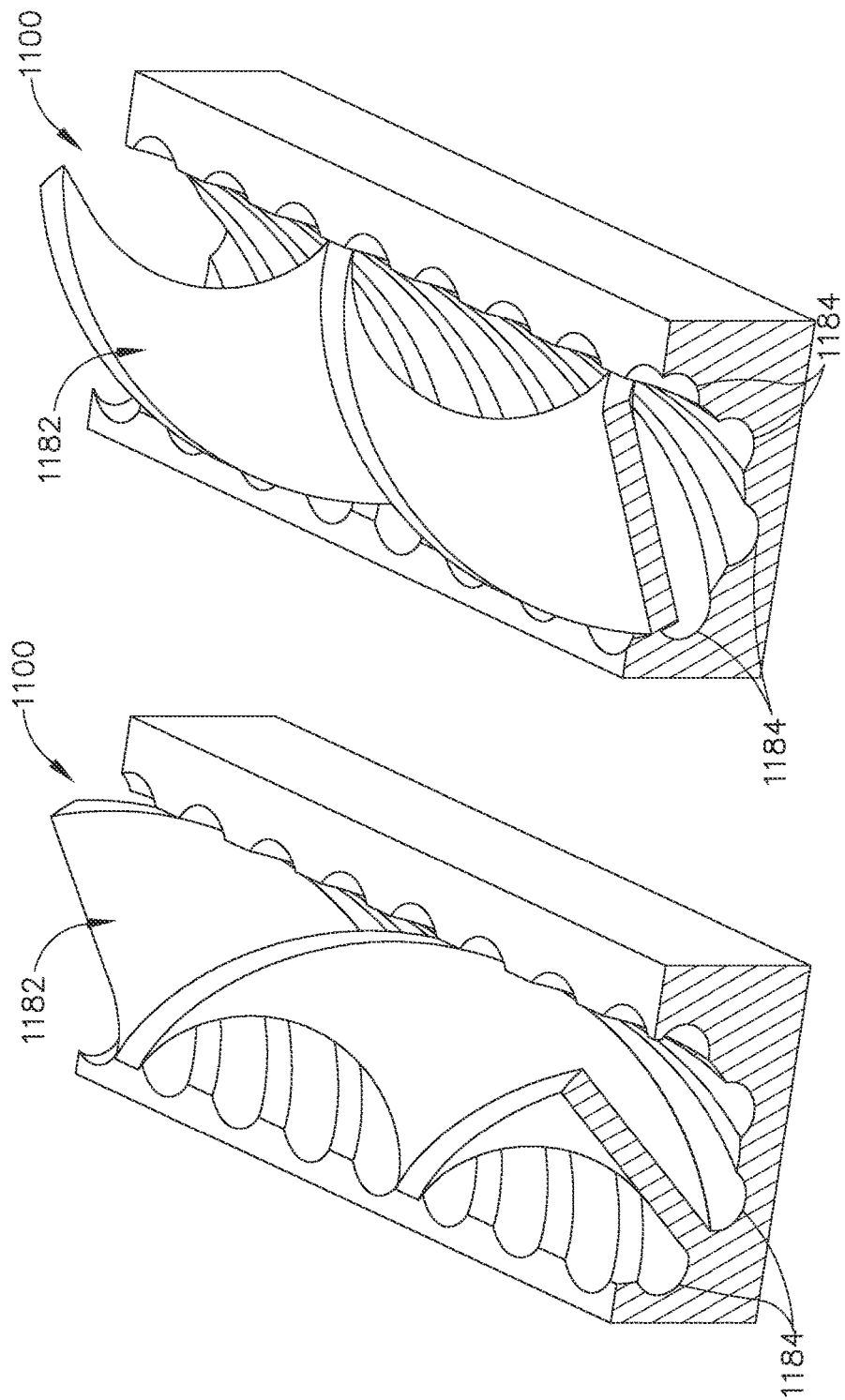

MONOLITHIC TUBE-IN MATRIX HEAT EXCHANGER

CROSS-REFERENCE TO RELATED APPLICATIONS

This application is a national stage application under 35 U.S.C. § 371(c) of prior filed, co-pending PCT application serial number PCT/US2014/065966, filed on Nov. 27, 2014 which claims priority to U.S. Patent Application Ser. No. 61/905,511, titled "Monolithic Tube-In Matrix Heat Exchanger" filed Nov. 18, 2013. The above-listed applications are herein incorporated by reference.

BACKGROUND

The present embodiments generally pertain to heat exchangers utilized with gas turbine engines. More particularly, but not by way of limitation, the present embodiments relate to monolithic tube-in matrix heat exchangers which provide robust and redundant leak containment while allowing heat transfer between multiple tube flow circuits.

In a gas turbine engine, air is pressurized in a compressor and mixed with fuel in a combustor for generating hot combustion gases which flow downstream through turbine stages. A typical gas turbine engine generally possesses a forward end and an aft end with its several core or propulsion components positioned axially therebetween. An air inlet or intake is located at a forward end of the gas turbine engine. Moving toward the aft end, in order, the intake is followed by a compressor, a combustion chamber, and a turbine. It will be readily apparent from those skilled in the art that additional components may also be included in the engine, such as, for example, low-pressure and high-pressure compressors, and low-pressure and high-pressure turbines. This, however, is not an exhaustive list. In a typical turbo-prop gas turbine engine aircraft, turbine stages extract energy from the combustion gases to turn a turbo-propeller. In some embodiments, the propulsor may power one or more turbo-propellors (hereinafter, "turbo-prop") in the case of some airplanes. In alternate embodiments, the propulsor may drive one or more turbo-propellers, embodied as rotors, for operation of a helicopter.

During operation, significant heat is generated by the high-pressure compressor which generates high temperature flow. It may be necessary to manage heat generation within the engine so as not to raise engine temperatures to unacceptable levels, which may cause engine failure. One method of doing this is by using bleed air to cool components. However, it may also be necessary to control the temperature of the compressor discharge air prior to such bleed air cooling other engine components.

In order to cool high pressure and temperature compressor discharge air, attempts have been made to utilize double-wall heat exchangers. However, such attempts have not been as successful as desired. Various shortcomings have been noted during the use of such heat exchangers where one bleed flow circuit operates at high temperature and high pressure concurrently. Due to the air gaps formed by outer walls that surround the inner walls or flow tubes, the heat transfer or thermal effectiveness of such double-wall exchangers is somewhat limited. Additionally, independent fluid flows may mix when structural failures occur. It would be desirable to increase the number of necessary failures in order to have the resultant undesirable mixing of fluids.

Additionally, alternative types of coolers, for example plate fin coolers, are susceptible to peel apart failures.

It would be desirable to provide a heat exchanger for two or more fluid flows to remain independent. It would also be desirable to decrease the likelihood of mixing of fluid flows due to failures in the heat exchanger by increasing the number of paths required for such failures. Additionally, it would be desirable to improve the thermal conductivity of the heat exchangers as compared to, for example, double-wall heat exchangers. It would further be desirable to provide a heat exchanger which meets these and other goals and which may be fabricated by additive manufacturing (three-dimensional printing) techniques.

The information included in this Background section of the specification, including any references cited herein and any description or discussion thereof, is included for technical reference purposes only and is not to be regarded subject matter by which the scope of the instant embodiments are to be bound.

SUMMARY OF THE INVENTION

According to present embodiments, a cross-flow heat exchanger for gas turbine engines is provided. The heat exchanger may be utilized to transfer heat from one fluid flow to a second independent fluid flow wherein one of the fluid flows has a high differential inlet pressure and temperature. The heat exchanger might have a robust construction to inhibit mixing of the fluid flows during a single burst duct event. The heat exchanger may be desirably constructed in various fashions including, but not limited to, additive manufacturing techniques.

According to some embodiments, a monolithic tube-in matrix heat exchanger comprises a monolithic body having a first fluid inlet and a first fluid outlet, the monolithic body having a second fluid inlet and a second fluid outlet. A first plurality of first fluid tubes is formed in the monolithic body and extends between the first fluid inlet and the first fluid outlet. A second plurality of second fluid tubes formed in the monolithic body and extends between the second fluid inlet and the second fluid outlet. The monolithic body may be formed of a highly conductive metal material which is coated by an oxidation-resistant coating. The first plurality of first fluid tubes form an array which is interleaved with the second plurality of second fluid tubes which forms a second array so that the first array is angled relative to the second array and an at least one diffusion barrier coats an exterior of the first and second plurality of fluid tubes.

All of the above outlined features are to be understood as exemplary only and many more features and objectives of the monolithic tube-in-matrix heat exchanger may be gleaned from the disclosure herein. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims. Therefore, no limiting interpretation of this summary is to be understood without further reading of the entire specification, claims, and drawings included herewith.

BRIEF DESCRIPTION OF THE DRAWINGS

The above-mentioned and other features and advantages of these exemplary embodiments, and the manner of attaining them, will become more apparent and the monolithic tube-in-matrix heat exchanger will be better understood by reference to the following description of embodiments taken in conjunction with the accompanying drawings, wherein:

FIG. 18 is an isometric section view of a further alternative tube embodiment;

FIG. 19 is an isometric section view of an alternative embodiment of FIG. 18.

DETAILED DESCRIPTION

Figure 1:
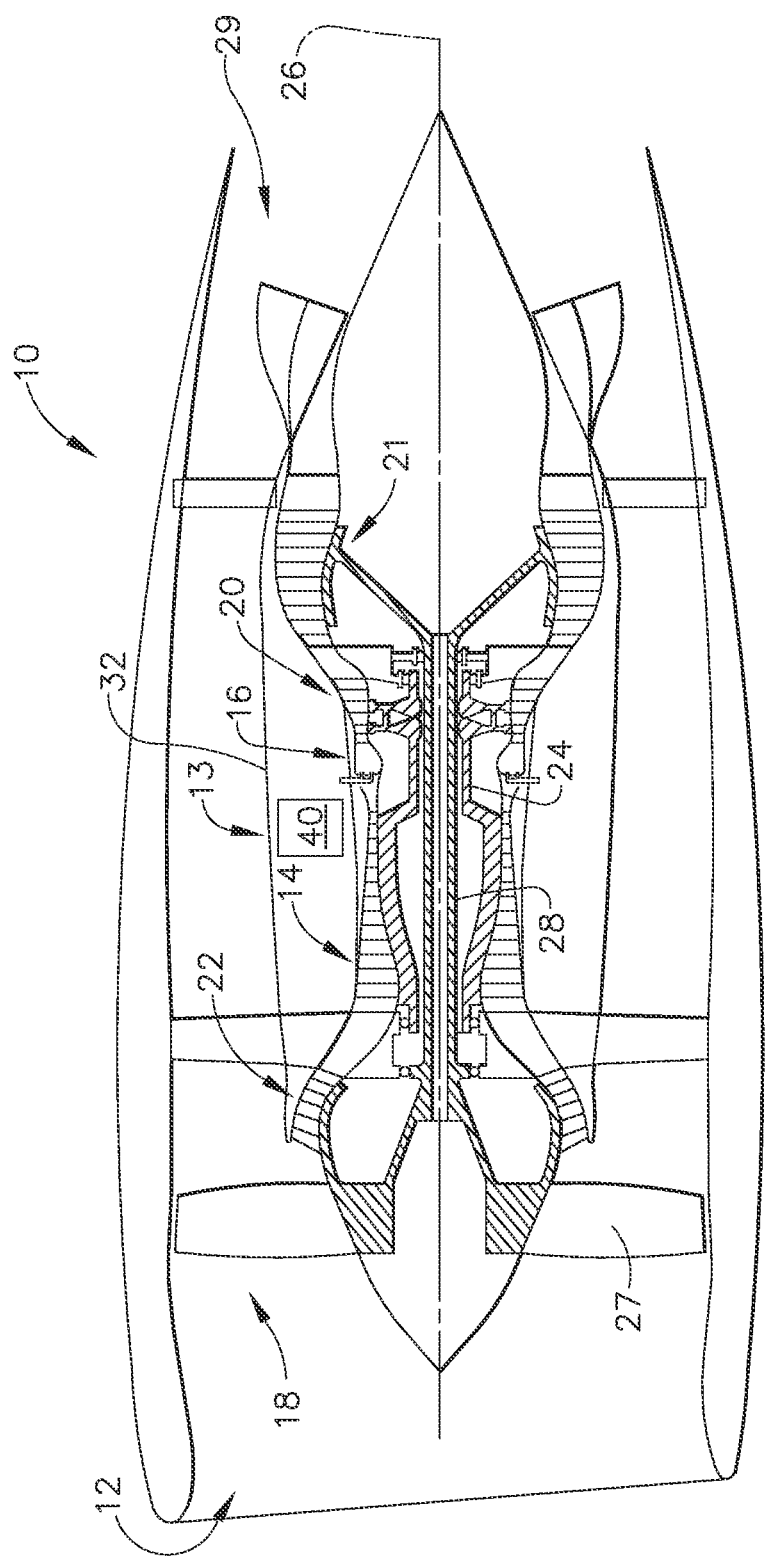
FIG. 1 is a schematic side view of an exemplary gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring to FIGS. 1-19, various embodiments of monolithic tube-in-matrix heat exchangers are depicted. The heat exchangers allow for cross flow of two or more fluids such that cooling is provided to at least one of the fluids for subsequent use within an engine, for example a gas turbine engine. The heat exchangers have a robust construction which can withstand the high differential inlet pressure and high differential inlet temperature of the fluid flows which may jeopardize the integrity of known brick-fin plate coolers or skived-fin surface coolers. The exemplary heat exchangers may include various features for mitigating combination of fluid flows and utilizes materials which enhanced thermal conductivity while allowing for a compact heat transport geometry with desirable thermo-physical characteristics.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine outlet, or a component being relatively closer to the engine outlet as compared to an inlet. As used herein, the terms "radial" or "radially" refer to a dimension extending between a center longitudinal axis of the engine and an outer engine circumference.

Referring initially to FIG. 1, a schematic side section view of a gas turbine engine 10 is shown having an engine inlet end 12 wherein air enters the core propulsor 13 which is defined generally by a multi-stage high pressure compressor 14, a combustor 16 and a multi-stage high pressure turbine 20. Collectively, the core propulsor 13 provides power for operation of the gas turbine engine 10.

The gas turbine engine 10 further comprises a fan 18, a low pressure turbine 21, and a low pressure compressor 22. The fan 18 includes an array of fan blades 27 extending radially outward from a rotor disc. Opposite the engine inlet end 12 in the axial direction is an exhaust side 29. In these embodiments, for example, gas turbine engine 10 may be any engine commercially available from General Electric Company. Although the gas turbine engine 10 is shown in an aviation embodiment, such example should not be considered limiting as the gas turbine engine 10 may be used for aviation, power generation, industrial, marine or the like.

In operation, air enters through the engine inlet end 12 of the gas turbine engine 10 and moves through at least one stage of compression in the low pressure and high pressure compressors 22, 14 where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades 27 which in turn cause rotation of the high pressure shaft 24. The high pressure shaft 24 passes toward the front of the gas turbine engine 10 to cause rotation of the one or more high pressure compressor 14 stages and continue the power cycle. A low pressure turbine 21 may also be utilized to extract further energy and power additional compressor stages. The fan 18 is connected by the low pressure shaft 28 to a low pressure compressor 22 and the low pressure turbine 21. The fan 18 creates thrust for the gas turbine engine 10.

The gas turbine engine 10 is axi-symmetrical about centerline axis 26 so that various engine components rotate thereabout. An axi-symmetrical high pressure shaft 24 extends through the turbine engine forward end into an aft end and is journaled by bearings along the length of the shaft structure. The high pressure shaft 24 rotates about the centerline axis 26 of the gas turbine engine 10. The high pressure shaft 24 may be hollow to allow rotation of a low pressure shaft 28 therein and independent of the high pressure shaft 24 rotation. The low pressure shaft 28 also may rotate about the centerline axis 26 of the engine. During operation the shafts 24, 28 rotate along with other structures connected to the shafts such as the rotor assemblies of the turbines 20, 21 in order to create power or thrust for various types of turbines used in power and industrial or aviation areas of use.

The gas turbine engine 10 further includes a monolithic tube-in-matrix heat exchanger 40 which is depicted between the core propulsor 13 and cowling 32 of the gas turbine engine 10. The heat exchanger 40 utilizes a first fluid and a second fluid cross-flow in order to cool one or more of the fluids passing through the heat exchanger 40. For example, the heat exchanger 40 may be utilized in air-air heat exchange such as where high-pressure compressor bleed air is cooled by compressed air of lower pressure compressor stages. According to alternative embodiments, air-liquid, for instance fuel, heat exchange may also occur within the heat exchanger 40.

Figure 2:
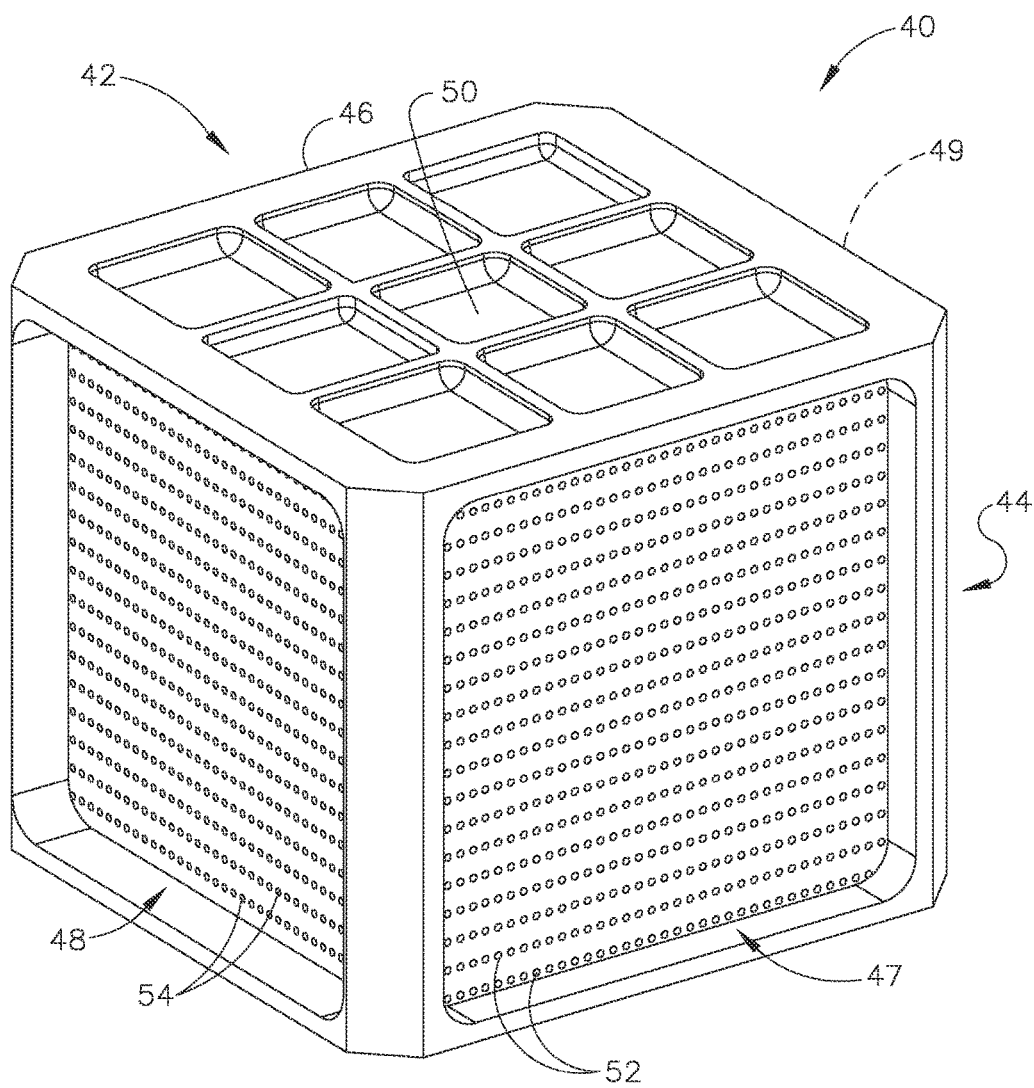
FIG. 2 is an isometric view of an exemplary heat exchanger.

Referring now to FIG. 2, an isometric view of an exemplary monolithic tube-in-matrix heat exchanger 40 is depicted. The heat exchanger 40 is shown as a box-shaped structure in the depicted embodiment, however various shapes may be utilized and the depicted embodiment should not be considered limiting. For example, alternate constructions are depicted in FIGS. 9 through 12 utilizing alternate shapes which will be discussed further herein. The depicted heat exchanger 40 includes a first fluid flow path 42 and a second fluid flow path 44. The first fluid flow path 42 includes a first fluid inlet 46 and a first fluid outlet 47. Similarly, the second fluid flow path 44 includes a second fluid inlet 48 and a second fluid outlet 49. Although the exemplary embodiment includes two fluid flow paths 42, 44, the illustrated embodiments are not limited to two fluid flow paths as additional fluid flow paths may be utilized. According to some embodiments, the fluid inlets 46, 48 and the fluid outlets 47, 49 define opposed faces. However, in other embodiments, the faces may not be opposed but instead may be at angles to one another.

The heat exchanger 40 includes a body 50 which is substantially monolithic and is formed of a high thermal conductivity material. For example, a casting alloy, copper casting alloy (C81500) or cast aluminum bronze (C95400) may be utilized for the body 50. Within the body 50 are a plurality of tubes 52 which extend between the first fluid inlet 46 and first fluid outlet 47, as well as a second plurality of tubes 54 extending between the second fluid inlet 48 and second fluid outlet 49. The tubes 52 may be formed separately and inserted into the body or may be formed integrally. The plurality of tubes 52, 54 are formed of a second material, for example a highly temperature-resistant alloy which is in thermal communication with the body 50. Such fluid tube materials may include, but are not limited to, incoloy alloy, INCONEL alloy, titanium-aluminide alloy stainless steel alloy or refractory metals. It may be desirable to as closely match coefficient of thermal expansion (CTE) in order to reduce stress build up during production and operation of the different materials utilized for the tubes 52, 54 and the body 50. Desirable features for the materials utilized include outstanding resistance to fatigue and oxidation resistance or corrosion resistance from air or seawater. Additionally, pressure tight castings, incorporation into welded assemblies of cast or wrought parts, highly effective vibration damping and machinability and weldability are all desirable characteristics. While the above list of characteristics is provided, such is not limiting as various materials may be utilized for the matching of tube and body components.

Additionally, the tubes 52, 54 may be coated with a diffusion barrier between dissimilar regions of metal. For example, the surface area of the tubes 52, 54 bounded by the material of the body 50 may be coated in a multi-layer process. According to one exemplary embodiment, a three layer coating process may be utilized wherein a first layer may comprise an electro-coated nickel bond coat followed by a gold overcoat for adhesion of the next layer. The third layer might be established by a physical vapor deposition (PVD) of sputtered material such as titanium nickel or titanium stabilized with W, Pt, Mo, NiCr, or NiV. In either of these embodiments, the third layer is intended to function as a diffusion barrier preventing alloy depletion of the tubes 52, 54 bounded by the body 50.

The body 50 of the heat exchanger 40 is shown in block form but is not limited to such six-sided polygon structure. Various multi-sided shapes may be utilized having additional sides beyond the input and output sides corresponding to the first and second fluid flow paths 42, 44. The body 50 may have more than six sides or less than six sides. The additional sides may reduce thermal gradients between flanges corresponding to inputs and outputs of the various fluid flows. Heat diffusion matrix may be formed by intersecting cylindrical volumes wherein the duct flanges may be circular rather than rectangular and the flow tube counts may vary by location and conform to the curvature of the matrix envelope. The surfaces of heat exchanger 40 may additionally be scalloped, as shown, or may be formed with various shapes to reduce weight of the heat exchanger 40 as it is desirable with gas turbine engines. Still further, while the depicted embodiment of the heat exchanger 40 may be a permanently mounted system, line replaceable units are well within the scope of the instant embodiments as shown in the additional figures provided herein.

Figure 3:
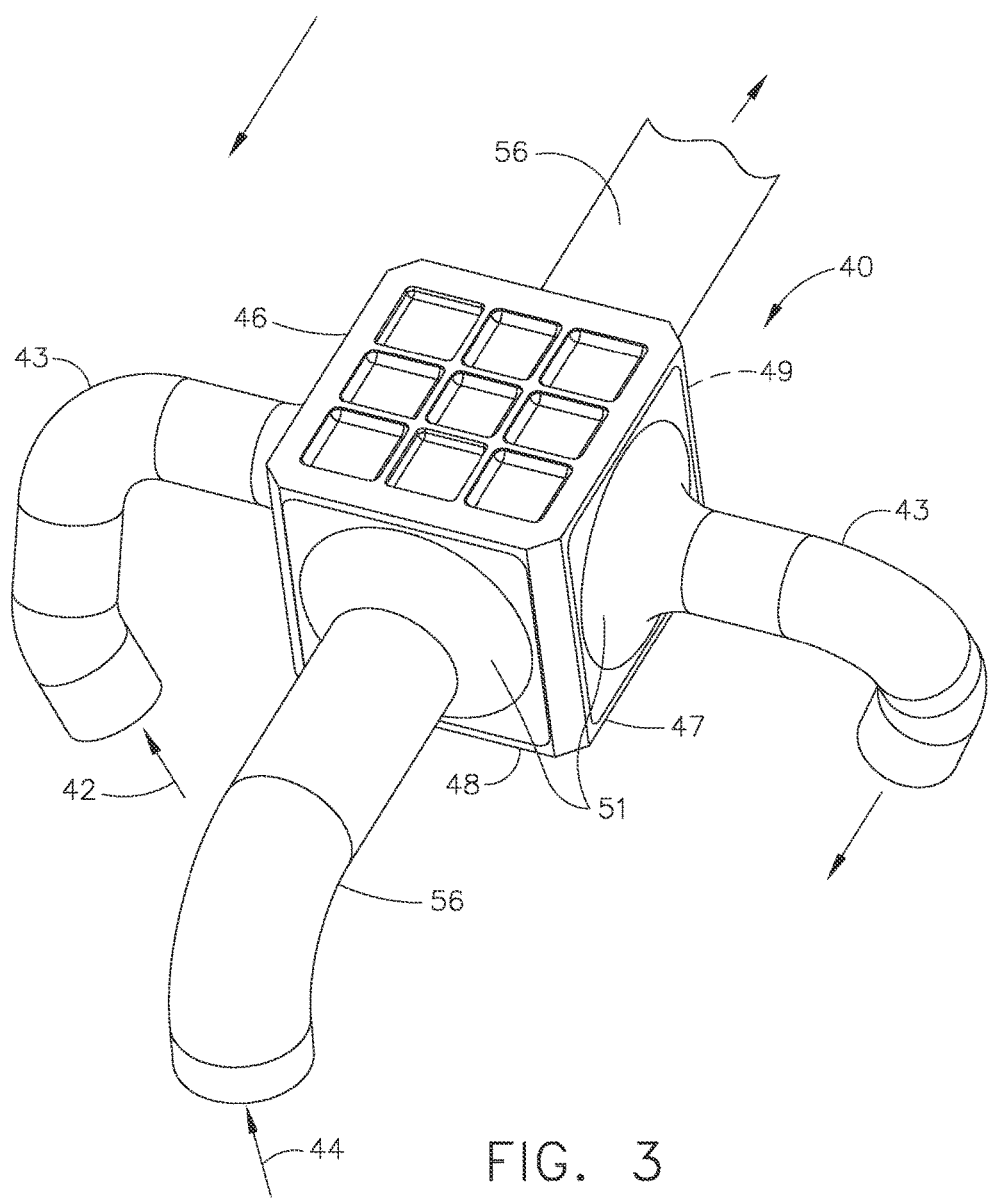
FIG. 3 is an isometric view of one exemplary embodiment of the heat exchanger and fluid flows.

Referring now to FIG. 3, an upper isometric view of the heat exchanger 40 is depicted. The depicted embodiment may be an air-air heat exchanger, however that description is merely exemplary of one non-limiting embodiment and for the purpose of describing this figure. A first fluid flow path 42 is depicted passing through a first duct or plenum 43 into the heat exchanger 40 through the first fluid inlet 46 and from the first fluid outlet 47 on the opposite side of the heat exchanger 40. The first fluid flow path 42 may be representative of, for example, a compressor discharge pressure bleed air. The compressor discharge pressure bleed air may be extremely high temperature and high-pressure air bleeding from a position closer to the combustor 16. A second plenum 56 provides a second path for second fluid flow path 44 to pass into the heat exchanger 40 at second fluid inlet 48. The plenum 56 extends from a second fluid outlet 49 of the exchanger 40. In operation, the first fluid flow 42 is of a higher temperature and pressure than the second fluid flow path 44 creating a high temperature and pressure differential between the two fluid flow paths 42, 44 within the heat exchanger 40.

The plenums 43, 56 may be joined to the heat exchanger 40 by a transition joint 51 and/or flanged connection. The transition joint 51 may be clad or explosion welded composite insert or properly matched materials whereby metals are subsequently welded to like metals in making a fusion weld joint. Suitable welding processes include, but are not limited to, ultrasonic, friction, induction, diffusion, arc and electron beam.

While gas-gas heat exchange is depicted according to one embodiment, other embodiments may include gas-liquid heat exchange whereby the liquid may be sub-cooled, saturated, supercritical or partially vaporized. For example, the compressor discharge first fluid flow path 42 may be cooled with water, water-based coolant mixtures, dielectric liquids, liquid fuels or fuel mixtures, refrigerants, cryogens, or cryogenic fuels such as liquefied natural gas (LNG) and liquid hydrogen. However, this list is not exhaustive and therefore should not be considered limiting.

As can be seen in this view, the fluid flow paths 42, 44 cross-flow directions passing through the heat exchanger 40. While the flows may be perpendicular to one another, other angles of fluid cross may be utilized.

Figure 4:
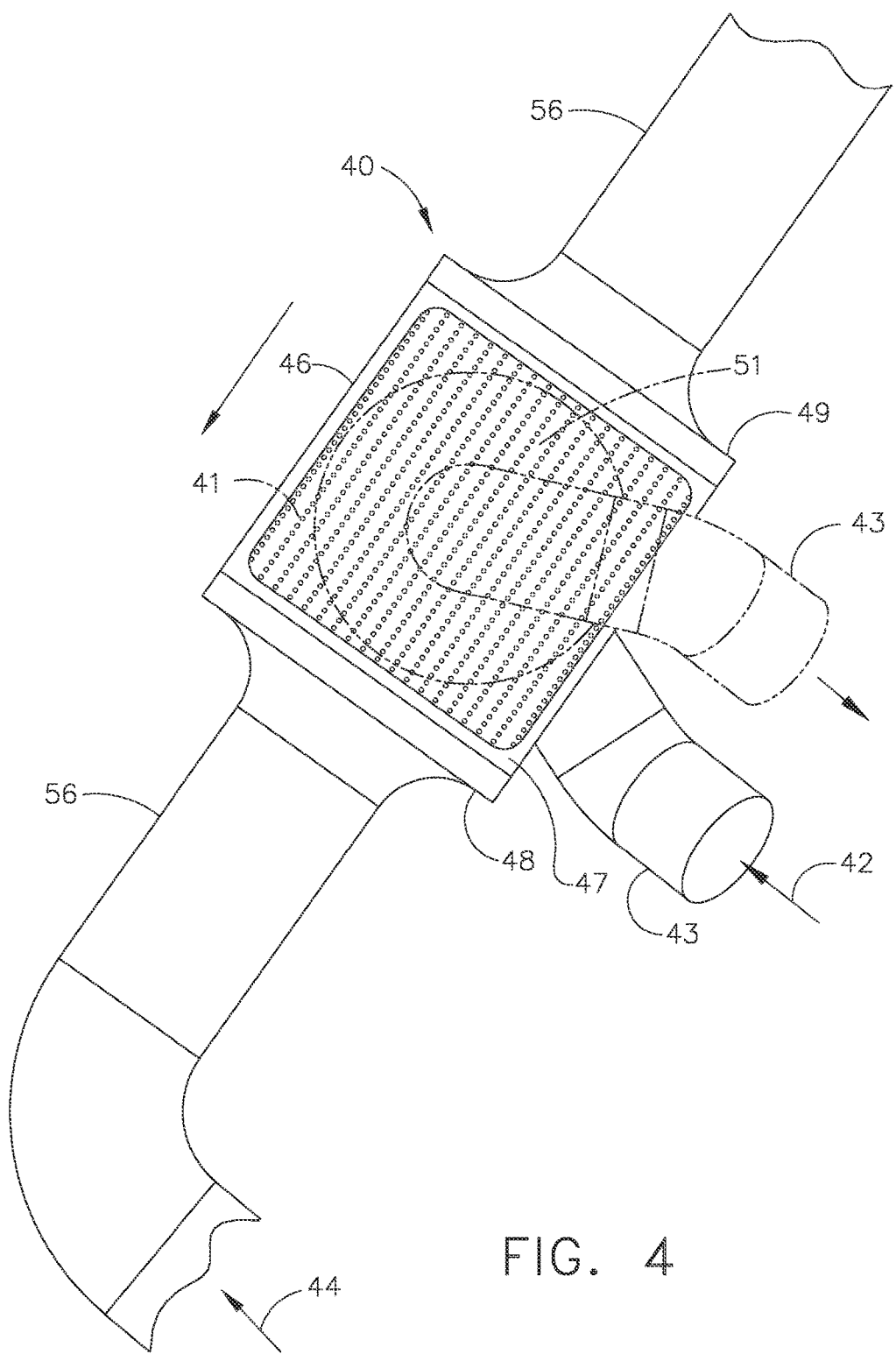
FIG. 4 is a side elevation view of the exemplary heat exchanger of FIG. 3.

Referring now to FIG. 4, the heat exchanger 40 is shown in side elevation view. In this view, the transition joints 51 are transparent so that the internal ducts may be seen. While the body 50 is solid, a matrix of tubes or pipes are disposed within the body 50 and extending in directions parallel to the flow plenums 43, 56 and between fluid inlets and outlets 46, 47 and 48, 49.

Figure 5:
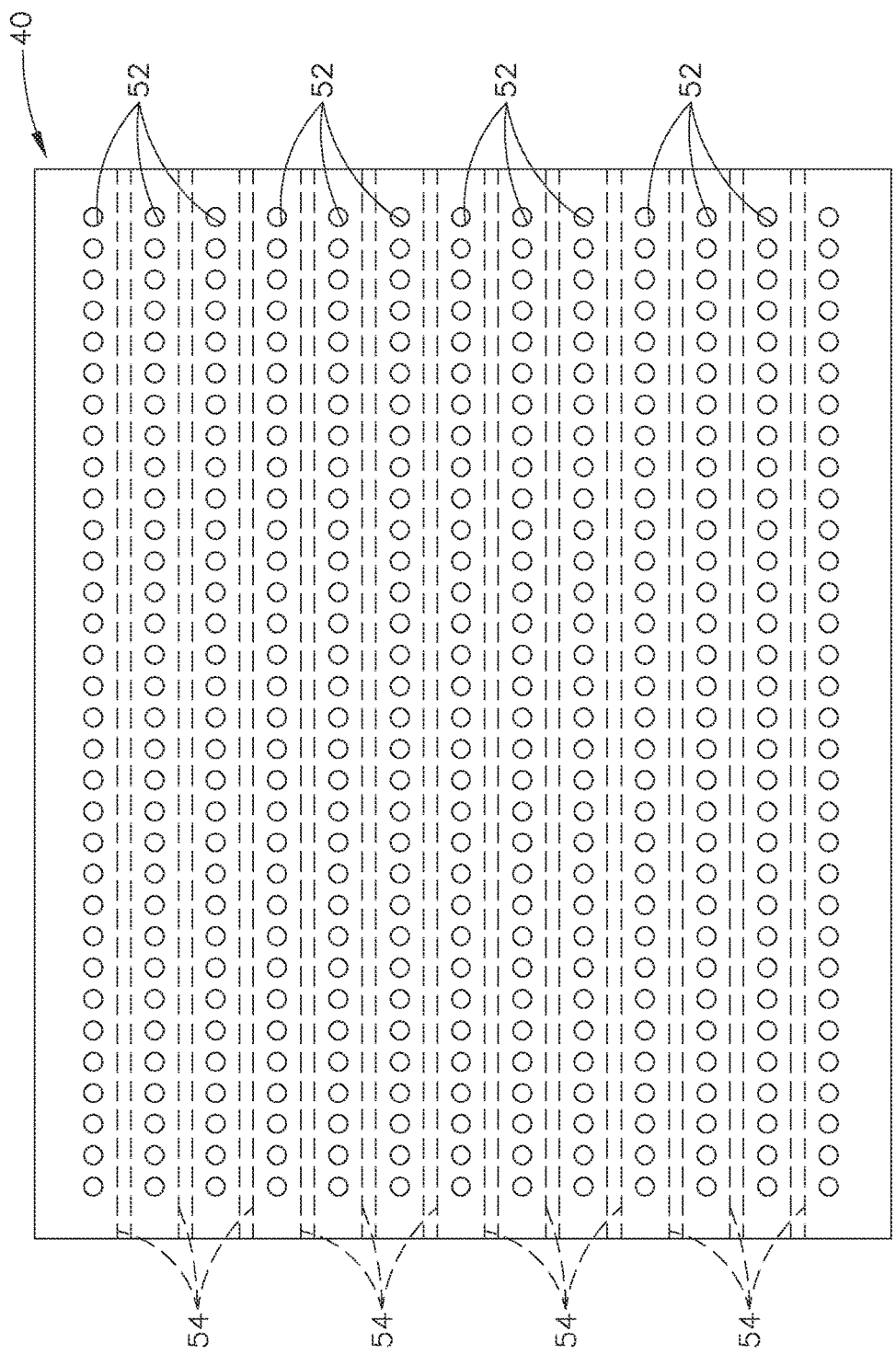
FIG. 5 is a section view of fluid flow tubes with a detail depicting the tubes of two fluid flows.

Referring now to FIG. 5, a section view of the heat exchanger 40 is shown. In order for fluid flow paths 42, 44 to cross through the heat exchanger 40, a plurality of tubes are formed in a matrix. The first plurality of tubes 52 carry hot fluid, such as air flow from first fluid flow path 42 (FIG. 4) from the compressor discharge through the heat exchanger 40. The second plurality of tubes 54 carry cooling fluid, air or liquid, through the heat exchanger 40. The second fluid flow may be lower pressure and temperature compressor bleed air.

A detail portion is shown in FIG. 5 to provide a close up view of the plurality of tubes 52. The tubes 54 are shown in broken line as they are hidden in the section shown. The tubes 52 are arranged in a matrix of horizontal rows at various elevations. Between each row of tubes 52, a row of tubes 54 extends in a direction between opposite faces of the heat exchanger 40. The rows of tubes 52, 54 extend in angled directions relative to one another, for example perpendicular directions in the depicted embodiment. However, this allows the fluid flows to move through the heat exchanger 40 without intermixing fluids which could result in a massive failure if one or more fluids are flammable.

The manufacturing of the instant heat exchanger 40 may occur in a variety of manners. However, one exemplary manufacturing technique may be additive manufacturing wherein the tubes 52, 54 are positioned within a matrix body 50 during the additive manufacturing of the body 50. This allows the materials to be joined during the manufacturing process.

Figure 6:
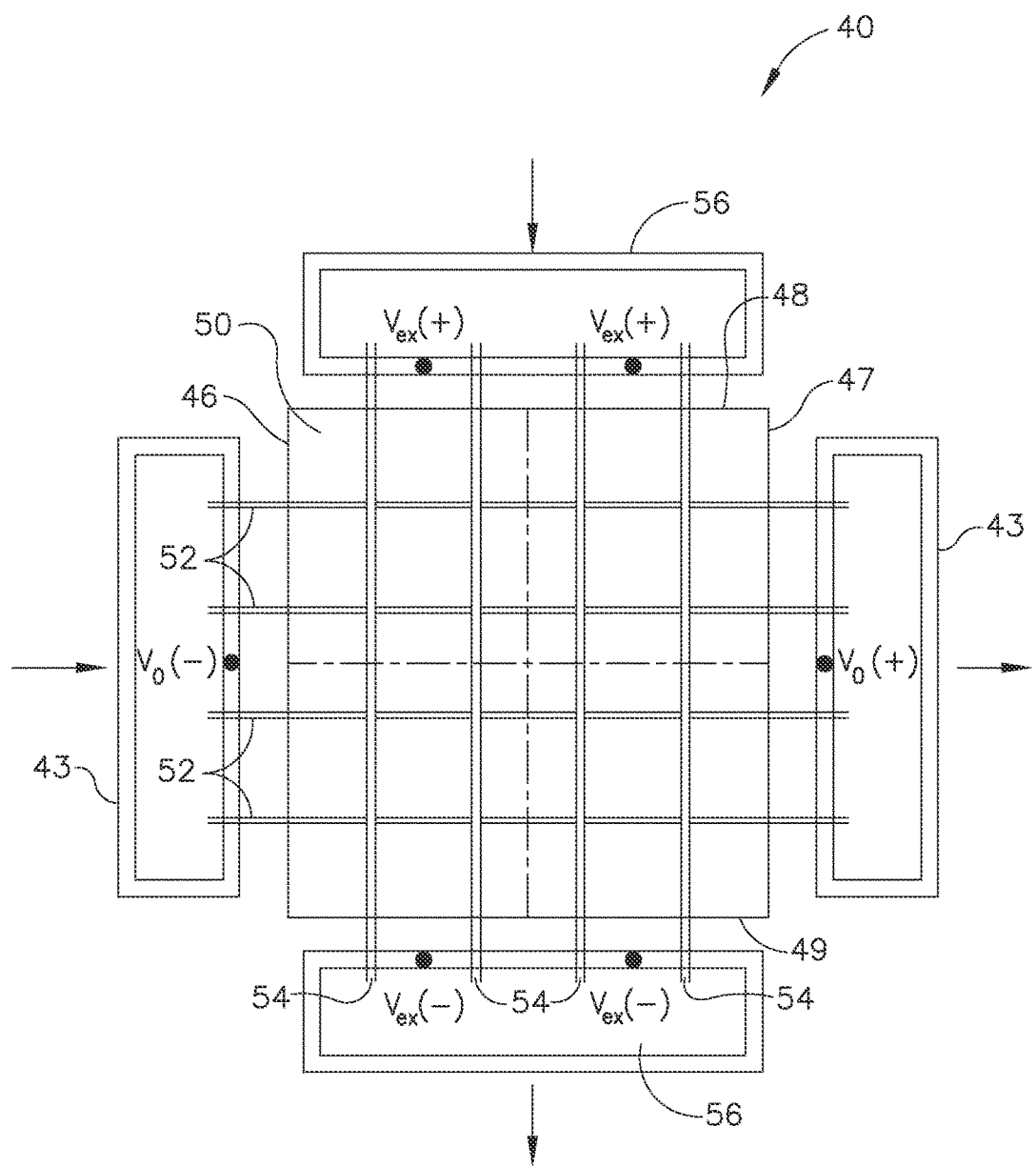
FIG. 6 is a schematic top section view of the heat exchanger with multiple fluid flows.

With reference now to FIG. 6, an exemplary schematic section view of the heat exchanger 40 is shown with the plurality of hot fluid flow tubes 52 and a plurality of cooling flow tubes 54 both passing through the matrix body 50. The tubes 52, 54 are formed in a criss-crossing array extending wherein the rows of hot fluid flow tubes 52 are at one elevation and the rows of hot flow tubes 54 are at an elevation below and an elevation above the cooling fluid tubes 52. While the instant embodiment depicts the tubes 52, 54 being linear in passing through the body 50, it is also within the scope of the instant embodiments that the tubes 52, 54 be curved, curvilinear, serpentine and/or that the tubes form a woven or interleaved pattern.

The figure also allows for visualizing the improvements in fluid mixing inhibition. In prior art heat exchangers, such as double-wall exchangers, with two modes of failure, the fluids may begin mixing. However, with the instant embodiment, one of the tubes 52 must fail or breach, then one of the tubes 54 must breach, and further, the body 50 matrix must crack between the first crack and the second crack mentioned above. Therefore, the instant embodiments require three modes of failure and the third mode having an extremely low likelihood of occurring. Moreover, the instant embodiment provides retention of leaking fluid by way of the matrix body 50 being a solid material.

Figure 7:
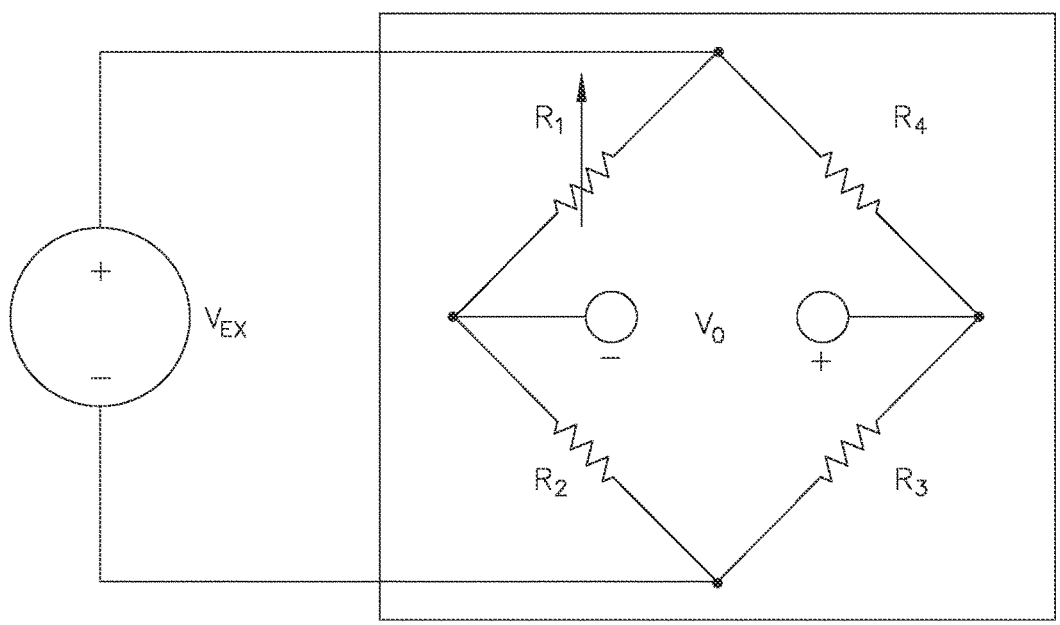
FIG. 7 is a schematic view of an electrical circuit used for detection of a leak.

Referring now to FIG. 7, a further embodiment is shown wherein a wheatstone bridge circuit is depicted for detecting a crack or leakage. According to one embodiment, the heat exchanger 40 (FIG. 6) is formed in zones similar to a wheatstone bridge. The four plenums 43, 56 (FIG. 6) correspond to the four nodes $R_1$, $R_2$, $R_3$, $R_4$ of the bridge circuit.

The bridge circuit is ideally balanced such that the voltage output $V_o=0$ where no cracks are found in the heat exchanger 40. Alternatively, when the bridge circuit is unbalanced, such as due to a crack, such voltage imbalance is detected.

Figure 8:
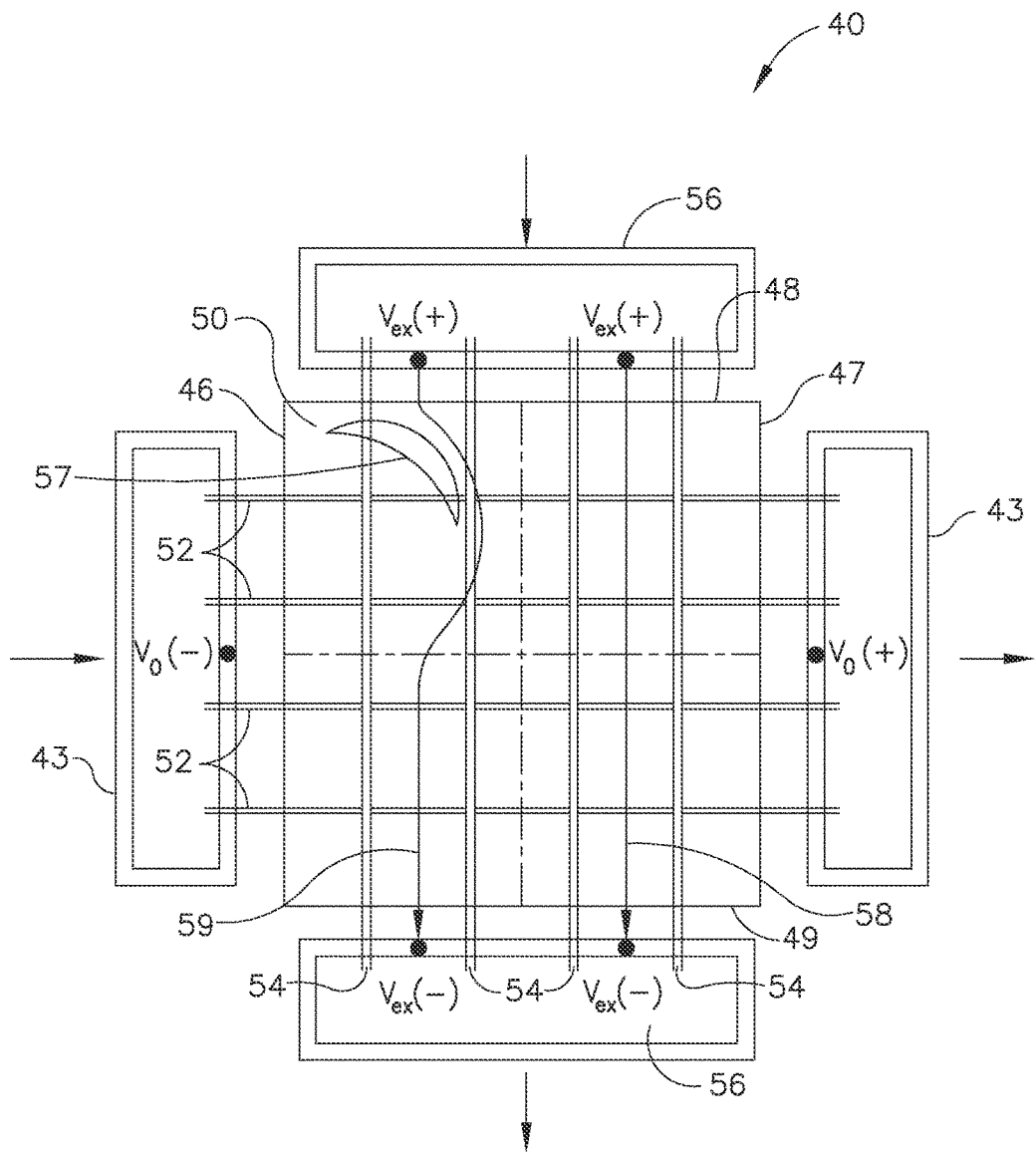
FIG. 8 is a schematic top section view of the heat exchanger with application of the electrical circuit of FIG. 7.

With reference additionally now to FIG. 8, the heat exchanger 40 is shown having four zones, similar to the bridge circuit wherein the four zones are generally defined by the broken lines intersecting at the center of the heat exchanger 40. A voltage 58 is applied to the two zones of tubes 52, 54 of the heat exchanger 40, for example at each of the plenums 43, 56. In the instant embodiment, a voltage 58 is applied between the plenums 56 and a voltage is applied between the plenums 43. Further, a crack 57 is shown in the system in the upper left quadrant. However, when a crack 57 is present, rather than having a balanced voltage, the resistance in the zone where the crack 57 and leak path between is located will change, causing an unbalancing of the circuit to the detected voltage output $V_o$. Accordingly, a voltage signal 59 is shown distorted and representing a varied signal from that of voltage 58, rather than equal as they should be when no crack or leak is present.

While the embodiment of FIGS. 7 and 8 are DC voltage systems, the resistors may be replaced with capacitors or capacitance gauges to establish a bridge circuit powered by an AC source.

Figure 9:
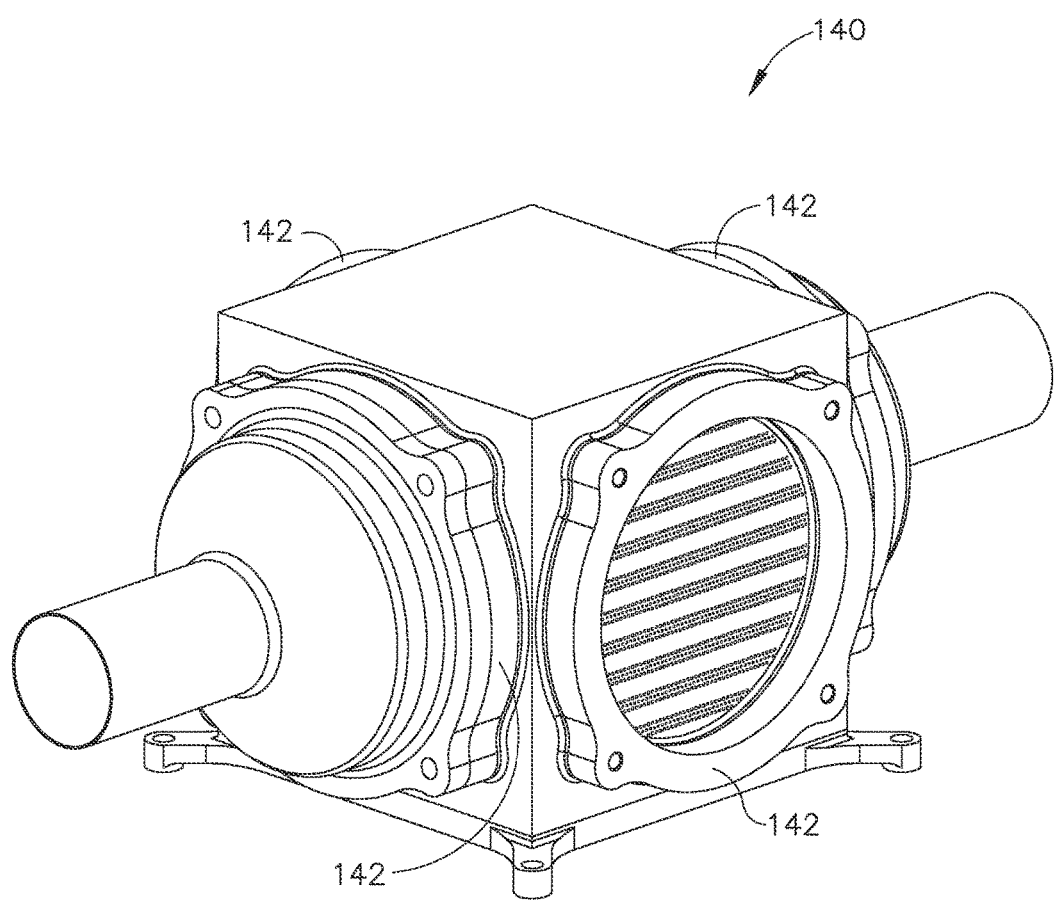
FIGS. 9-13 are isometric views of various embodiments of the heat exchanger shown as in-line unit forms.

Referring now to FIGS. 9-13, various alternative embodiments of the heat exchanger 40 are shown. As previously described, the embodiments of FIGS. 2-3 have welded connections for plenums 43, 56. According to these alternative embodiments, the heat exchangers 140, 240, 340, 440, 540 may be in-line replaceable units to aid in ease of replacement during routine or unexpected maintenance scenarios. According to FIG. 9, the heat exchanger 140 includes flanges 142 for connection to plenums. The heat exchanger 140 is generally box-shaped but other shapes may be utilized depending on the location of the heat exchanger 140. Additionally, as shown in FIG. 9, the arrays of tubes may be formed in pattern of rows as shown at an end face of the heat exchanger 140.

Figure 10:
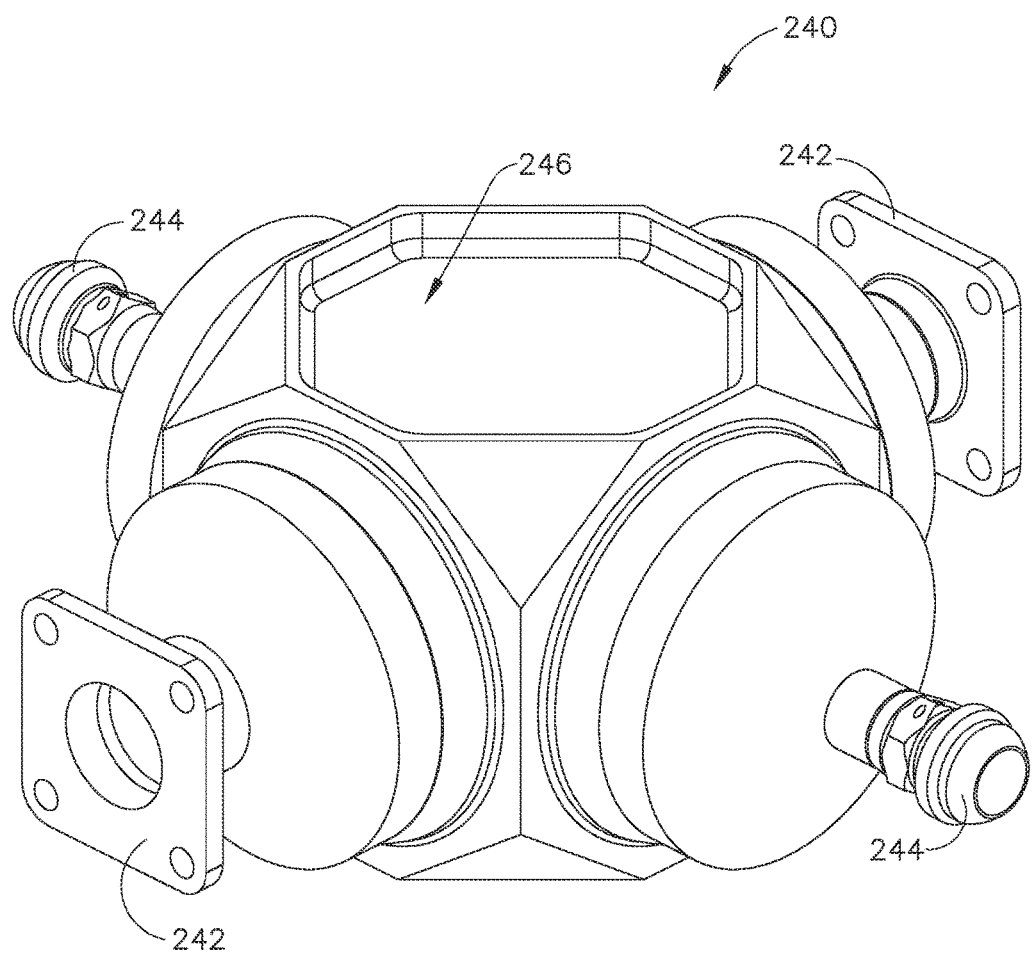

According to the embodiment of FIG. 10, the heat exchanger 240 is box-shaped with a plurality of chamfered corners. The chamfers allow for improved placement and positioning with the round shape of the gas turbine engine 10. The heat exchanger 240 may also have one or more type of fittings 242, 244 for connection of the plenums and to ensure correct connection. For example, a first type of fitting may be used for hot fluid and a second type of fitting for the cooling fluid to aid in correct connection during the maintenance. Additionally, the heat exchanger 240 includes at least one area of removed material 246, shown in the top of the heat exchanger 240, to aid in weight reduction of the unit.

Figure 11:
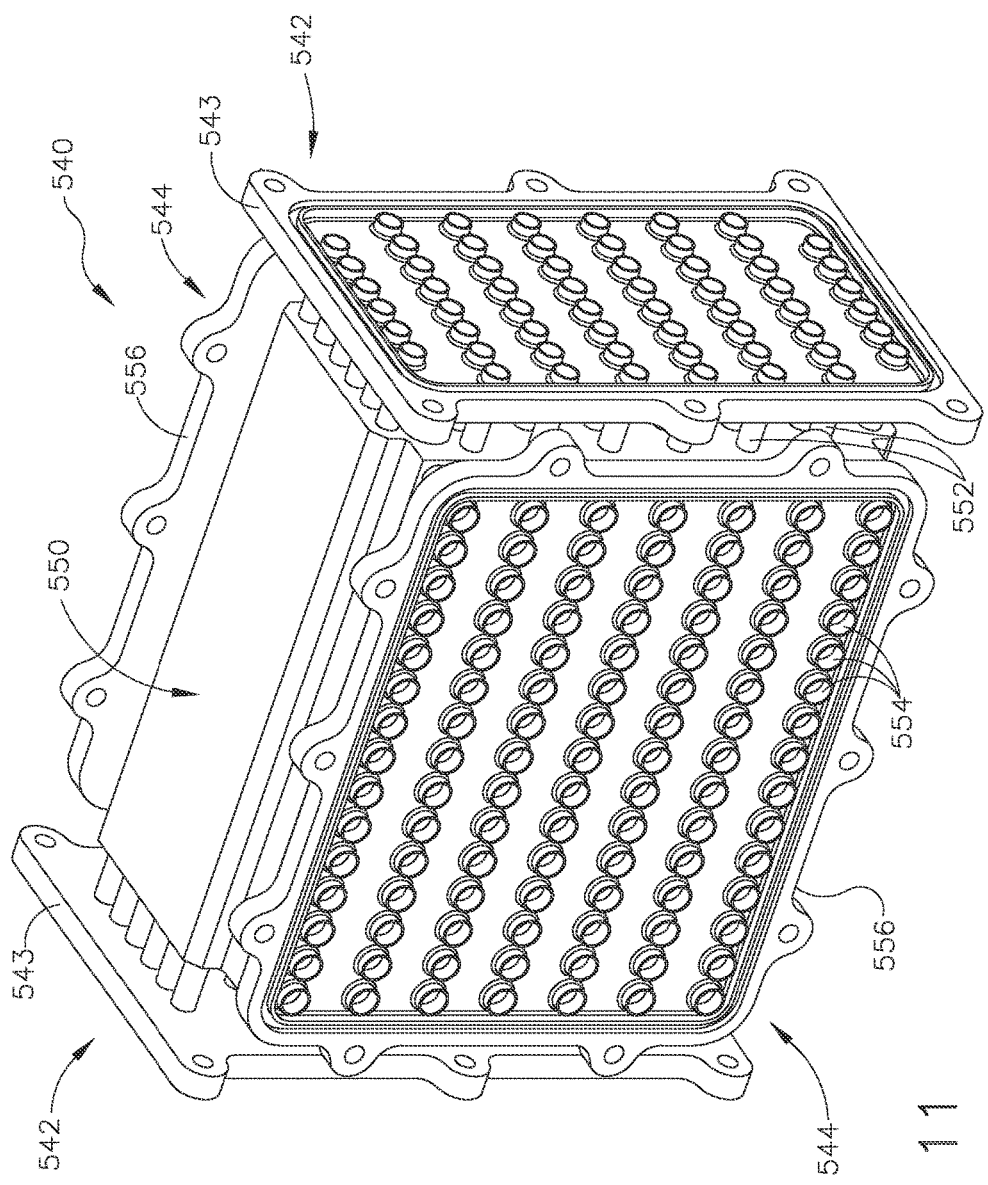

At FIG. 11, a further embodiment of the heat exchanger 540 is depicted. According to this embodiment, the heat exchanger 540 includes a body 550 and the plurality of tubes 552, 554 extending through the body 550. The body 550 is in flow communication with flow paths 542, 544. The tubes 552, 554 extend beyond the faces of the body 550 and plenums 543, 556 are shown at the ends of the tubes 552, 554. The plenums 543, 556 are spaced from the body 550 and cantilevered from the face of the body 550. The embodiment depicts four separate plenums 543, 556. It is within the scope of the instant disclosure that the heat exchanger 540 utilize one plenum or a multiple of plenums, as depicted. The plenums may be bolted by fastener connection as shown with a plurality of fastener apertures or alternatively, may be connected in other fashions as previously described, such as by welding for example.

Figure 12:
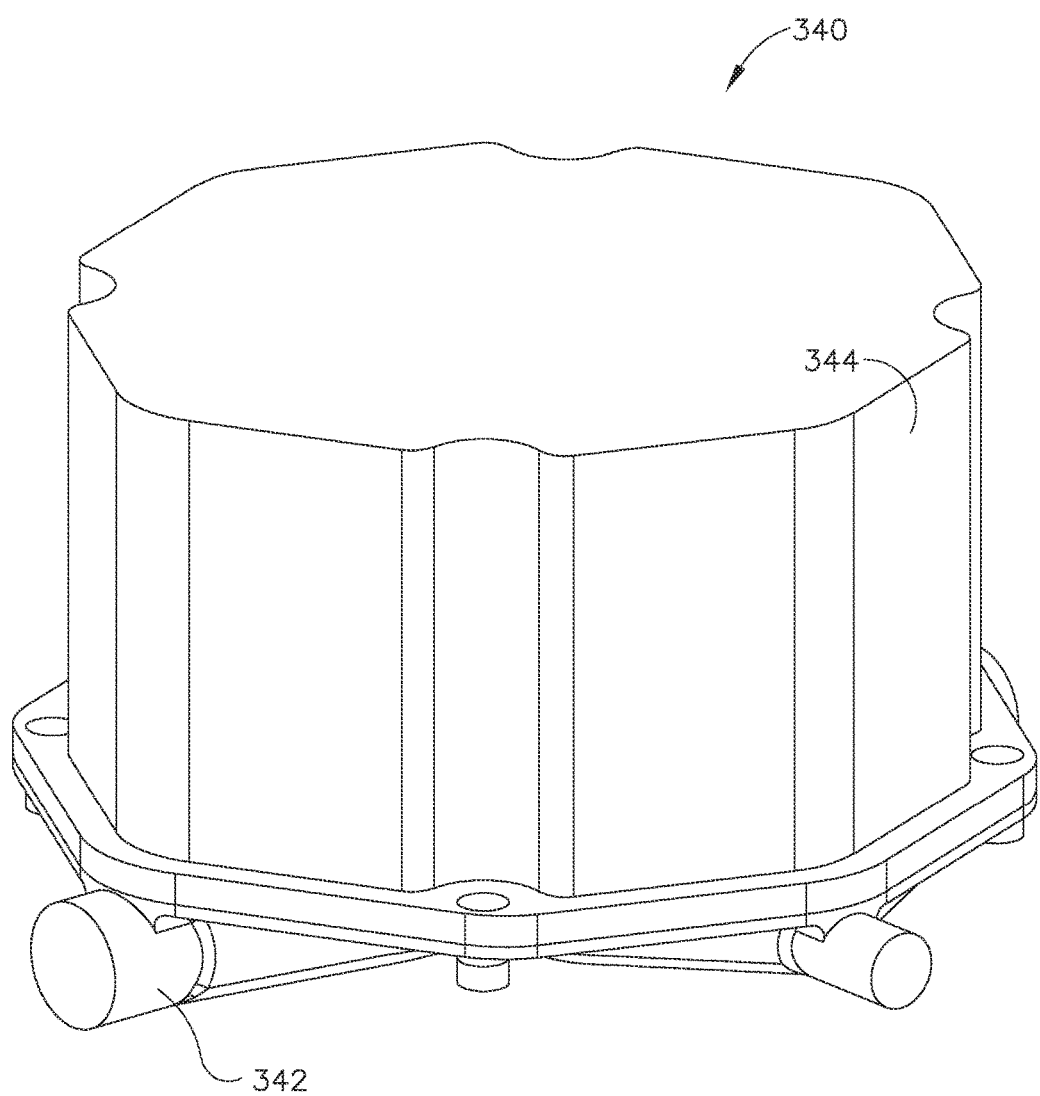
Figure 13:
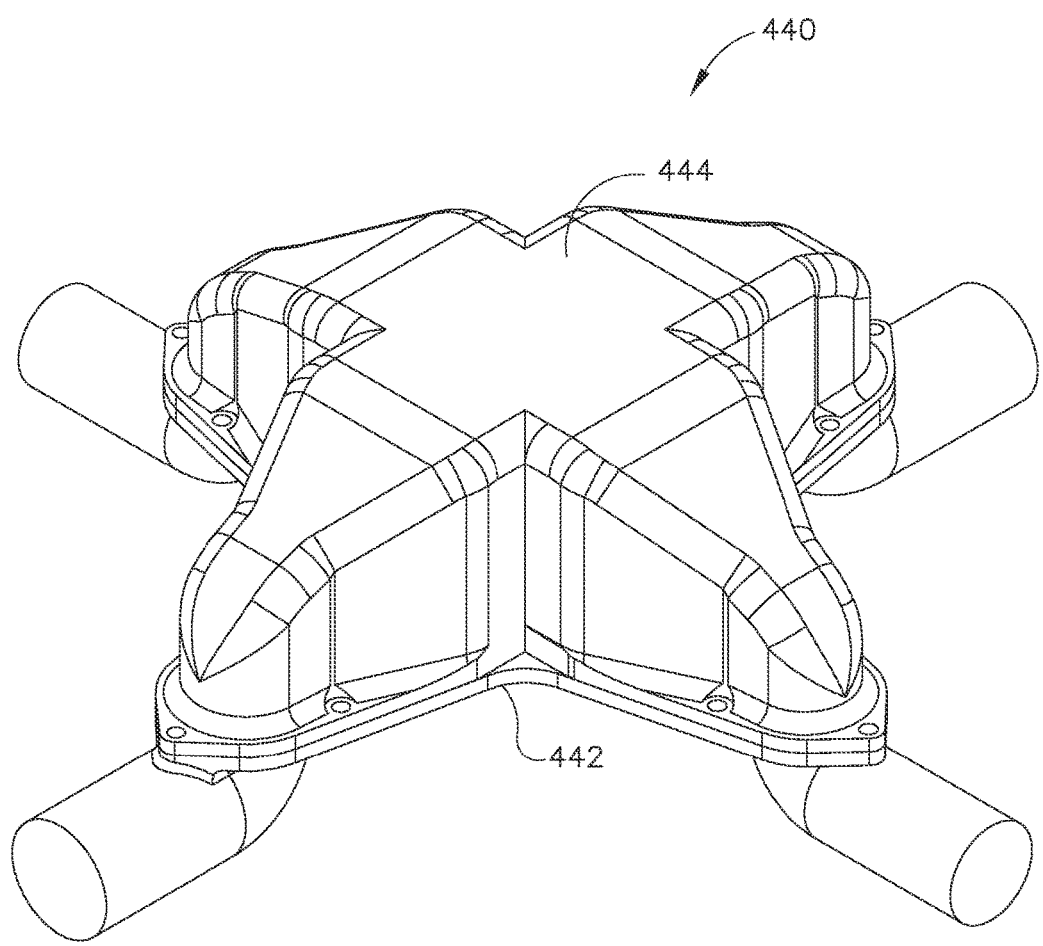

According to the embodiments of FIGS. 12 and 13, the heat exchangers 340, 440 are cartridge type exchangers. The cartridge style heat exchangers 340, 440 have two main components, the base 342, 442, and the cartridge 344, 444. The bases 342, 442 are installed with the intent to not remove the base 342, 442. The bases 342, 442 may be mounted in-line or may be mounted to the gas turbine engine 10. The inlet and outlet lines may be connected to the base either by directly welding to the base 342, 442, using traditional fittings or a combination thereof. The cartridge 344, 444 is made to be easily removable and may be replaced in the field. The cartridge 344, 444 constructions can be of many forms and can be readily manufactured using cast or additive manufacturing process. The cartridges 344, 444 may be a bolt-on type or may use a quick disconnect feature.

Figure 14:
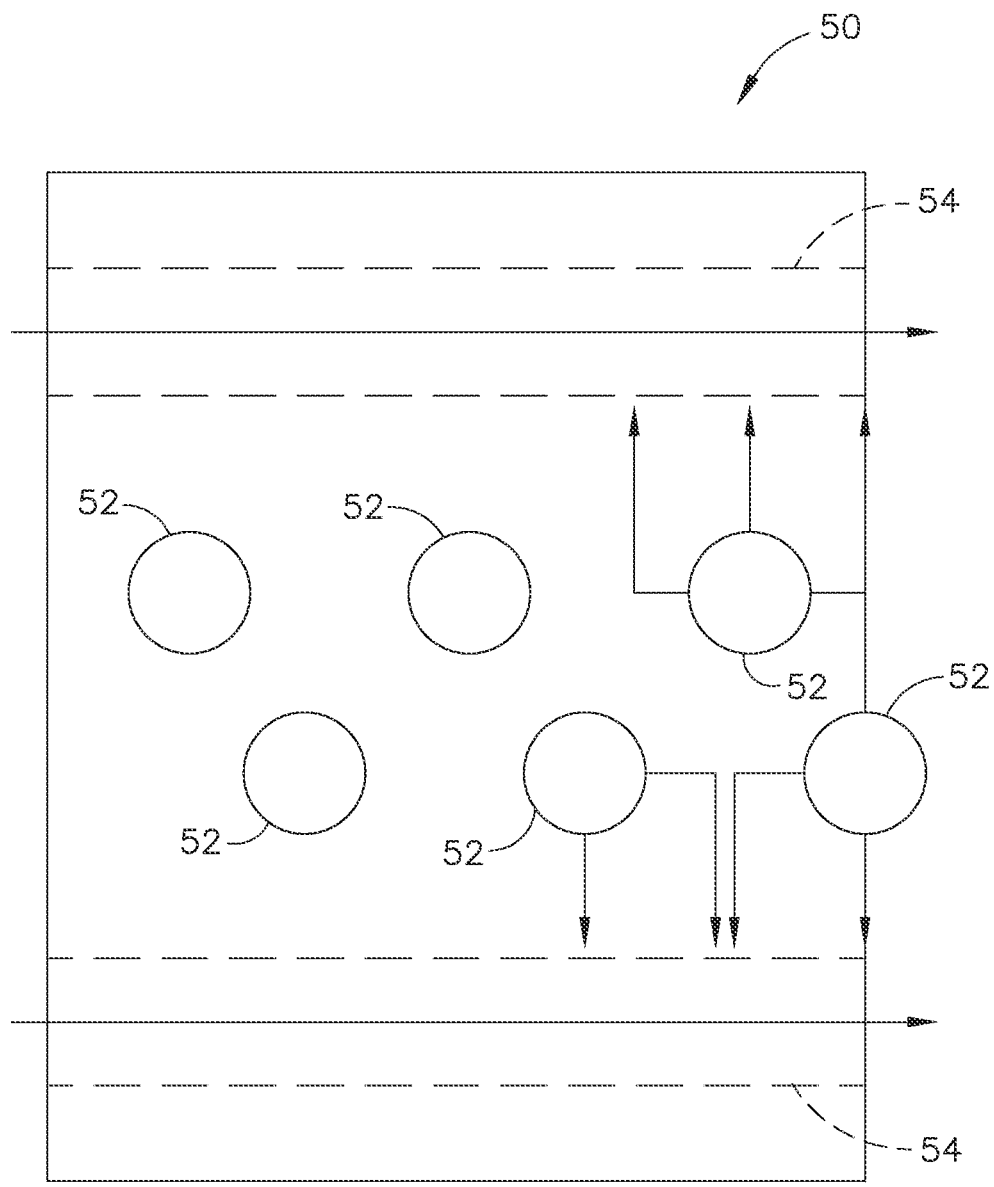
FIG. 14 is a cross-sectional view of an exemplary heat exchanger and tube arrangement.
Figure 15:
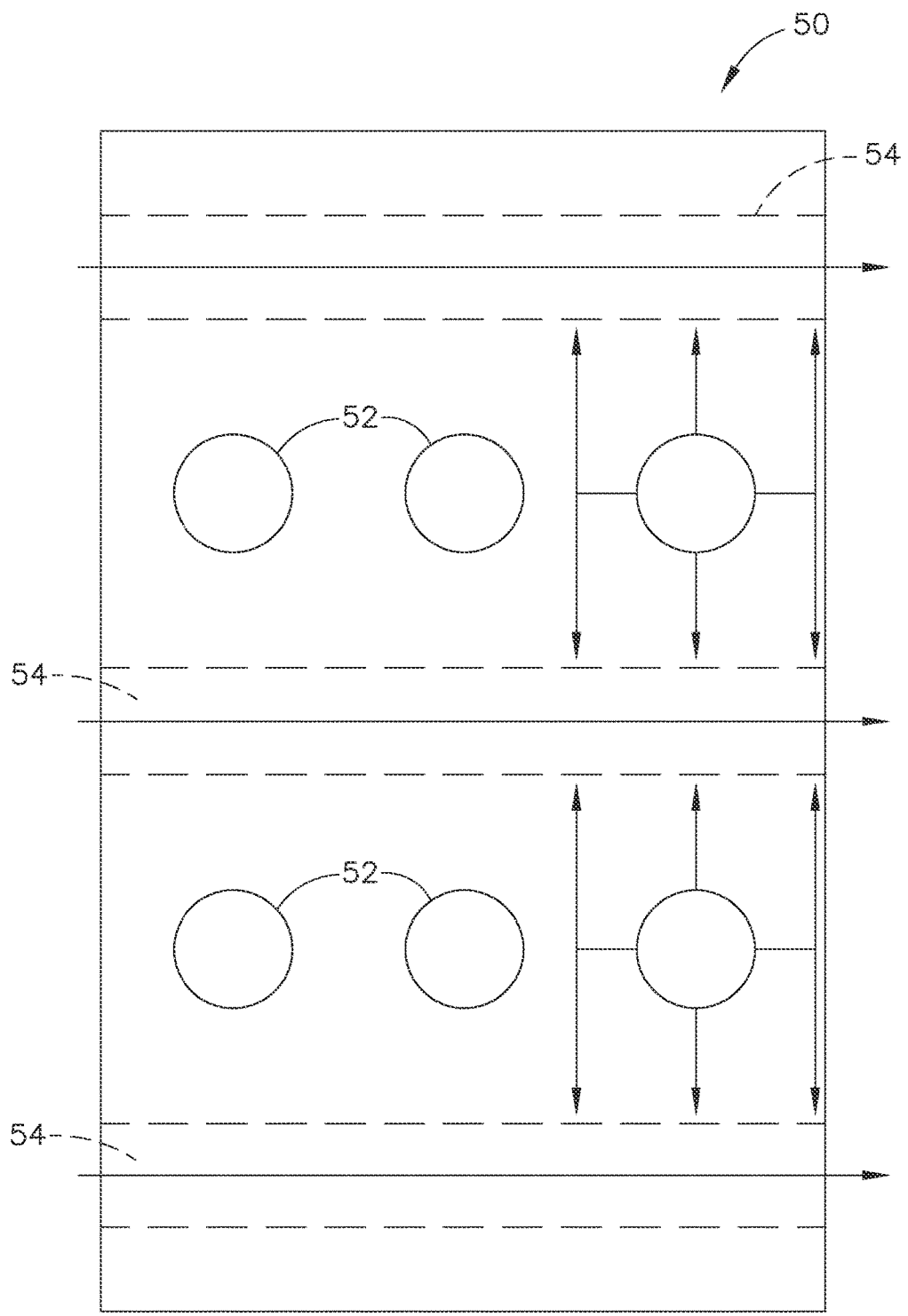
FIG. 15 is a cross-sectional view of a second exemplary heat exchanger and tube arrangement.

With reference now to FIGS. 14 and 15, the two arrangements of tubes 52, 54 are depicted for passing through the body 50. According to the embodiment of FIG. 13, the body 50 includes rows 54 of cooling fluid and two rows of offset hot fluid tubes 52 passing between the two rows 54. The tubes 52 are offset in the vertical direction depicted, however the tubes may alternatively be aligned in a vertical direction. As compared to the embodiment of FIG. 14, the embodiment of FIG. 15 has improved performance relative to pressure drop requirements of the tubes 52.

The embodiment of FIG. 15 has one row of tubes 52 disposed between pair of tube rows 54. As compared to FIG. 14, the embodiment of FIG. 15 has improved thermal transfer because the cooling tubes 54 are disposed on two sides of each tube 52.

Figure 16:
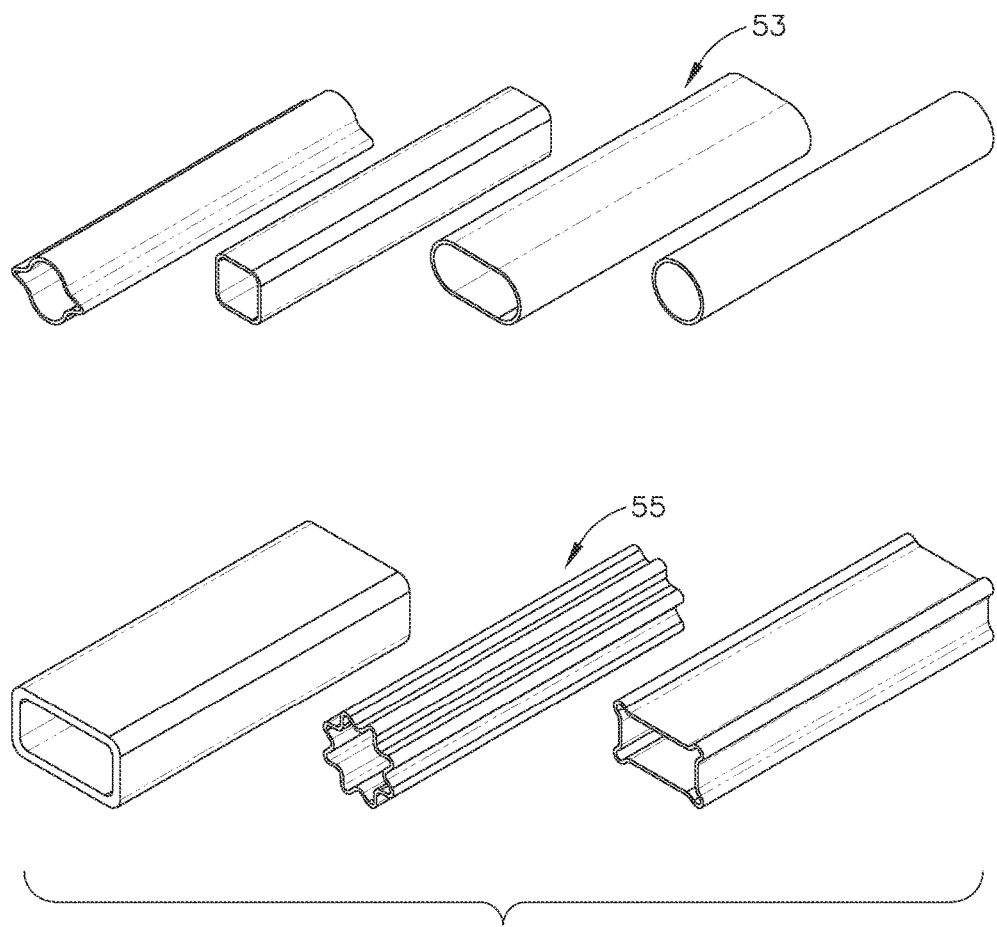
FIG. 16 is a cross-section of various tube shapes which may be utilized in the instant heat exchanger embodiments.

With reference now to FIG. 16, various tube types are shown in cross-section. While the embodiments of tubes 52, 54 have been shown as circular cross-section, for purpose of reducing stress concentration, it is well within the scope of the instant embodiments that the tubes 52, 54 are of alternate cross-section. A few desirable cross-sections include, but are not limited to, a flat oval 53 and lobed star shape 55, both of which enhance the ratio of effective length to cross-sectional area for heat conduction between tubes and therefore improve heat transfer.

Figure 17:
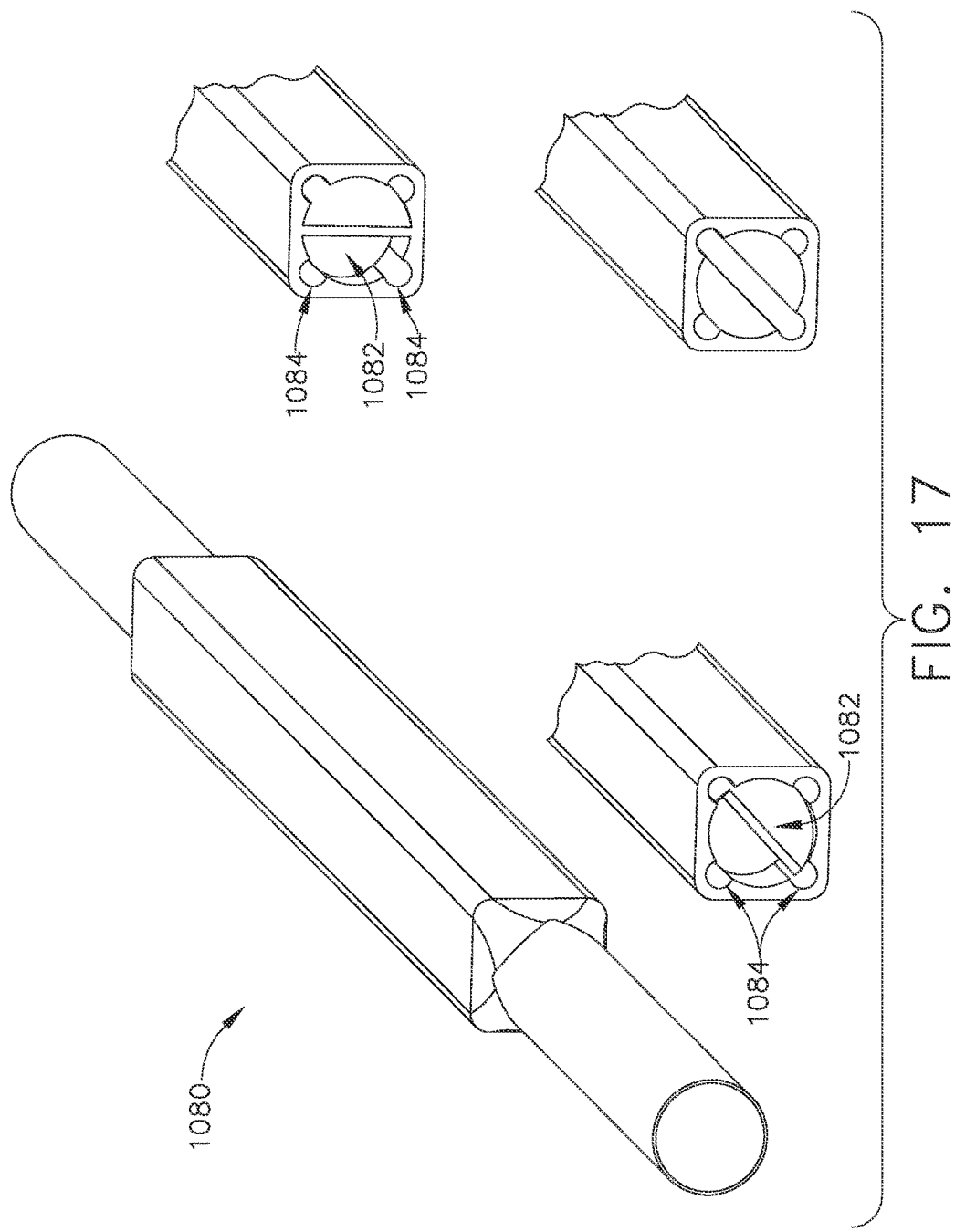
FIG. 17 is a view of further embodiments of tube shapes which may be utilized.

With reference now to FIG. 17, an additional flow tube embodiment is depicted comprising two differing cross-sectional shapes. The shapes may differ completely or may have differing internal and external shapes. Ends of the tube 1080 are shown with circular cross-section while a central portion has a square external cross-section. The tube 1080 is shown cut in two locations wherein the embodiment may include a flow turbulation feature 1082. The flow turbulation feature 1082 may take various embodiments including the twisted fin structure depicted. In the embodiment shown, the fin is substantially vertical at one location, but in a differing location the embodiment shows the fin twisted. Additional features 1084 may include dimples, lobes or other turbulating features on the inner surface of the tube 1080. Further, features may include corrugations or other such turbulating features. Additionally, the depicted fin 1082 may be continuously helical or may be broken up into sections of turning fins which may or may not be helical. Additionally, although the fin feature 1082 is shown extending from one inside surface to another, the turbulating features may not extend entirely across the inner diameter or inner dimension of the tube 1080.

Referring now to FIG. 18, a further alternative tube embodiment is shown in isometric view. The isometric view is sectioned in part, allowing for full viewing of a helical structure. In the instant embodiment, the tube 1100 is shown having the lobed star shape, as shown in an embodiment of FIG. 16 lower row, center. In this embodiment, the exterior shape of the tube 1100 is square or rectangular shaped, or alternatively provides that the tube 1100 is formed integrally in the body 50 of the heat exchanger 40, for example. The tube 1100 includes a plurality of lobes 1184 may extend in a linear fashion as in FIG. 16 or as depicted may extend helically. In this embodiment, the lobes 1184 are helical, rotating about the central axis of the tube along the axial direction of the tube 1100. In the depicted embodiment, the lobes 1184 are shown turning counterclockwise when moving from the forward end of the tube 1100 to the aft end of the tube 1100. This is merely exemplary and such rotation may be in the opposite direction. Additionally, the tube 1100 may include a turbulator feature 1182, similar to that shown in the embodiment of FIG. 17. The turbulators 1182 may rotate in the same direction as the lobes 1184 and are said to be co-rotating as shown or may rotate in an opposite direction (FIG. 19) and are said to be counter-rotating. The turbulator 1182 may turn or spiral in the same angular rate as the lobes 1184 or may rotate at a different angular rate. Still further, the turbulator 1182 may include one or more helical structures which rotate in a direction opposite to the direction of the lobes 1102. In some embodiments, the turbulator 1182 may be embodied by a single turbulator or may be embodied by two or more turbulators located within the tube 1100 along the axial direction. In the instance where two or more turbulators 1182 are used, the turbulators 1182 may all spiral in one direction or in different directions (FIG. 19), to increase heat transfer with the tube 1100 and the body 50. In the instance where lobes turn in a direction opposite that of the turbulators, it may be necessary to form holes at locations where the spiral or helical turbulators completely block flow through the lobes 1102.

Referring briefly to FIG. 19, an isometric section view is depicted of a tube 1100. In this embodiment, the tube 1100 has a plurality of lobes 1184 which turn in the same direction as the embodiment of FIG. 18. However, either embodiment may comprise lobes 1184 which may twist in the clockwise direction rather than the counter-clockwise direction. Further, the instant embodiment includes a helical turbulator 1182 which is counter-rotating relative to the lobes 1184. As mentioned previously, multiple turbulators 1182 may be utilized wherein the turbulators rotate in the same direction relative to one another, or may rotate in opposite directions relative to one another and may be connected or may be spaced apart axially along the axial direction of the tube 1100.

The foregoing description of structures and methods has been presented for purposes of illustration. It is not intended to be exhaustive or to limit the invention to the precise steps and/or forms disclosed, and obviously many modifications and variations are possible in light of the above teaching. Features described herein may be combined in any combination. Steps of a method described herein may be performed in any sequence that is physically possible. It is understood that while certain embodiments of methods and materials have been illustrated and described, it is not limited thereto and instead will only be limited by the claims, appended hereto.

What is claimed is:

1. A monolithic tube-in matrix heat exchanger, comprising:
   a monolithic body having a first fluid inlet, a first fluid outlet, a second fluid inlet, and a second fluid outlet, wherein the monolithic body being formed of a thermally conductive metallic material which is coated by an oxidation-resistant coating;
   a plurality of first fluid tubes formed in the monolithic body and extending between the first fluid inlet and the first fluid outlet;
   a plurality of second fluid tubes formed in the monolithic body and extending between the second fluid inlet and the second fluid outlet;
   at least one diffusion barrier coating disposed on an exterior of the plurality of first fluid tubes and an exterior of the plurality of second fluid tubes;
   a turbulence generating element formed integrally with an internal cross-section of at least one first fluid tube of the plurality of first fluid tubes and an internal cross-section of at least one second fluid tube of the plurality of second fluid tubes, wherein the turbulence generating element comprises a fin comprising a vertical first location and a twisted second location;
   at least one plenum extending from each of four faces of the monolithic body; and
   an electrical circuit, including four nodes, wherein the at least one plenum extending from each of the four faces of the monolithic body is configured as a node of the electrical circuit,
   wherein the plurality of first fluid tubes forms a first array which is transverse to the plurality of second fluid tubes which forms a second array.

2. The monolithic tube-in matrix heat exchanger of claim 1, wherein the first and second fluid inlets and the first and second fluid outlets are at opposed faces of the monolithic body.

3. The monolithic tube-in matrix heat exchanger of claim 1, wherein the first and second fluid inlets and the first and second fluid outlets are at non-opposed faces of the monolithic body.

4. The monolithic tube-in matrix heat exchanger of claim 1, wherein the monolithic body is a polygonal body of at least six sides.

5. The monolithic tube-in matrix heat exchanger of claim 1, wherein the thermally conductive metallic material is a casting alloy.

6. The monolithic tube-in matrix heat exchanger of claim 1, wherein the thermally conductive metallic material is a temperature-resistant alloy.

7. The monolithic tube-in matrix heat exchanger of claim 1, wherein the plurality of first fluid tubes and the plurality of second fluid tubes are circular in cross-sectional shape.

8. The monolithic tube-in matrix heat exchanger of claim 1, wherein the plurality of first fluid tubes and the plurality of second fluid tubes are non-circular in cross-sectional shape.

9. The monolithic tube-in matrix heat exchanger of claim 8, wherein the plurality of first fluid tubes and the plurality of second fluid tubes are one of a flat oval shaped cross-section or a lobed star shaped cross-section.

10. The monolithic tube-in matrix heat exchanger of claim 9, wherein at least one fluid tube of the lobed star shaped cross-section is helically twisted along a portion of its length.

11. The monolithic tube-in matrix heat exchanger of claim 9, wherein at least one fluid tube of the flat oval shaped cross-section is helically twisted along a portion of its length.

12. The monolithic tube-in matrix heat exchanger of claim 1, wherein a cross-section of at least one fluid tube of the plurality of first fluid tubes and the plurality of second fluid tubes comprises a non-circular exterior perimeter and a circular interior perimeter.

13. The monolithic tube-in matrix heat exchanger of claim 1, wherein the turbulence generating element is configured to increase convection heat transfer.

14. The monolithic tube-in matrix heat exchanger of claim 1, wherein a single row of the plurality of first fluid tubes in the first array is disposed between transverse rows of the plurality of second fluid tubes in the second array.

15. The monolithic tube-in matrix heat exchanger of claim 1, wherein at least two rows of the plurality of first fluid tubes in the first array are disposed between transverse rows of the plurality of second fluid tubes in the second array.

16. The monolithic tube-in matrix heat exchanger of claim 1, wherein the electrical circuit is configured to detect at least one of a crack formation or growth in the monolithic tube-in matrix heat exchanger.

17. The monolithic tube-in matrix heat exchanger of claim 1, wherein the electrical circuit is configured to detect fluid leakage from one of the plurality of first tubes and the plurality of second fluid tubes to another of the plurality of first fluid tubes and the plurality of second fluid tubes.

18. The monolithic tube-in matrix heat exchanger of claim 1, wherein the turbulence generating element further comprises a lobe.

19. The monolithic tube-in matrix heat exchanger of claim 1, wherein the turbulence generating element further comprises a plurality of dimples.

20. The monolithic tube-in matrix heat exchanger of claim 1, wherein the turbulence generating element extends partially across the internal cross-section of the at least one first fluid tube of the plurality of first fluid tubes and the internal cross-section of the at least one second fluid tube of the plurality of second fluid tubes.

21. The monolithic tube-in matrix heat exchanger of claim 9, wherein a cross-section of at least one fluid tube of the plurality of first fluid tubes and the plurality of second fluid tubes comprises a lobed-star shaped exterior perimeter and a lobed-star shaped interior perimeter.

* * * * *